United States Patent
Larsson et al.

(10) Patent No.: US 11,890,936 B2
(45) Date of Patent: Feb. 6, 2024

(54) TRANSMISSION FOR A VEHICLE

(71) Applicant: Ningbo Geely Automobile Research & Development Co., Ltd., Ningbo (CN)

(72) Inventors: Johannes Larsson, Gothenburg (SE); Branko Micic, Gothenburg (SE)

(73) Assignee: Ningbo Geely Automobile Research & Development Co., Ltd., Ningbo (CN)

( * ) Notice: Subject to any disclaimer, the term of this patent is extended or adjusted under 35 U.S.C. 154(b) by 146 days.

(21) Appl. No.: 17/327,678

(22) Filed: May 22, 2021

(65) Prior Publication Data

US 2021/0276406 A1 Sep. 9, 2021

Related U.S. Application Data

(63) Continuation of application No. PCT/CN2019/111825, filed on Oct. 18, 2019.

(30) Foreign Application Priority Data

Nov. 29, 2018 (EP) ..................................... 18209170

(51) Int. Cl.
- *B60K 6/387* (2007.10)
- *B60K 6/36* (2007.10)
- *B60K 6/442* (2007.10)
- *B60K 6/547* (2007.10)

(52) U.S. Cl.
CPC ................ *B60K 6/387* (2013.01); *B60K 6/36* (2013.01); *B60K 6/442* (2013.01); *B60K 6/547* (2013.01); *B60Y 2200/92* (2013.01)

(58) Field of Classification Search
CPC .......... B60K 6/387; B60K 6/36; B60K 6/442; B60K 6/547

USPC ............................................................ 74/661
See application file for complete search history.

(56) References Cited

U.S. PATENT DOCUMENTS

| 6,634,247 | B2* | 10/2003 | Pels ........................ B60K 6/48 |
| | | | 74/330 |
| 8,297,141 | B2* | 10/2012 | Cimatti ............... F16H 57/0439 |
| | | | 74/330 |
| 8,608,615 | B2* | 12/2013 | Fuechtner ................. F16H 3/10 |
| | | | 74/330 |
| 10,670,123 | B2* | 6/2020 | Yang ........................ B60K 6/52 |

(Continued)

FOREIGN PATENT DOCUMENTS

| CN | 102691770 A | 9/2012 |
| CN | 202896270 U | 4/2013 |

(Continued)

OTHER PUBLICATIONS

International Search Report from corresponding International Application No. PCT/CN2019/111825, dated Dec. 31, 2019, 2 pages.

*Primary Examiner* — Ha Dinh Ho
(74) *Attorney, Agent, or Firm* — Tucker Ellis LLP

(57) ABSTRACT

A transmission for a vehicle. The transmission includes a first input shaft, a second input shaft and a clutch by which the first input shaft and the second input shaft are selectively connectable to an engine, and an electric machine connected to the first input shaft. The transmission further includes an output shaft connected to a final drive. The first input shaft is permanently connected to the output shaft and the second input shaft is connectable to the output shaft.

12 Claims, 2 Drawing Sheets

(56) References Cited

U.S. PATENT DOCUMENTS

| | | | |
|---|---|---|---|
| 2006/0130601 A1* | 6/2006 | Hughes | B60K 6/48 |
| | | | 477/3 |
| 2007/0175723 A1 | 8/2007 | Blessing | |
| 2012/0216638 A1 | 8/2012 | Pritchard | |

FOREIGN PATENT DOCUMENTS

| | | |
|---|---|---|
| CN | 203543640 U | 4/2014 |
| CN | 104343898 A | 2/2015 |
| CN | 106143112 A | 11/2016 |
| CN | 107650664 A | 2/2018 |
| CN | 207809033 U | 9/2018 |
| DE | 102005048938 A1 | 4/2007 |
| DE | 102013206176 A1 | 10/2014 |
| KR | 101500203 B1 | 3/2015 |

\* cited by examiner

TRANSMISSION FOR A VEHICLE

RELATED APPLICATION DATA

This application is a continuation of International Patent Application No. PCT/CN2019/111825, filed Oct. 18, 2019, which claims the benefit of European Patent Application No. 18209170.2, filed Nov. 29, 2018, the disclosures of which are incorporated herein by reference in their entireties.

TECHNICAL FIELD

The invention relates to a transmission for a vehicle, which transmission comprises a first input shaft, a second input shaft and a clutch by which the first input shaft and the second input shaft are selectively connectable to an engine, and an electric machine connected to the first input shaft. The transmission further comprises an output shaft connected to a final drive.

BACKGROUND

For a hybrid vehicle where an engine and one or more electric motors are connected to a gearbox for transmitting torque from the gearbox to wheels of the vehicle, a transmission with a gearbox and an electric motor can be designed in many ways for achieving the requisite gears and functions.

There are however boundary conditions with respect to costs, weight and available space at the same time as it should be possible to use both the engine and the electric motor in an efficient way.

SUMMARY

An objective of the invention is to provide a transmission comprising an electric machine which transmission enables a more effective way of using power sources in a transmission for a vehicle.

The objective is achieved by a transmission for a vehicle, wherein the transmission comprises a first input shaft, a second input shaft and a clutch by which the first input shaft and the second input shaft are selectively connectable to an engine, and an electric machine connected to the first input shaft, and wherein the transmission further comprises an output shaft connected to a final drive, and the first input shaft is permanently connected to the output shaft and the second input shaft is connectable to the output shaft.

The invention is based on the insight that by such a transmission the electric machine can be used in a flexible manner at the same time as the losses on the transmission can be reduced.

The power provided by the electric machine can be used in a way allowing the complexity of the mechanical components of the transmission to be reduced. The electric machine and the engine provide torque at different speeds, and gear ratios can be combined such that the number of gears can be reduced while providing the requisite torque over the entire speed interval.

By having the first input shaft permanently connected to the output shaft, no coupling sleeve or synchronizer is needed. Hereby, losses and weight can be reduced. A reduced number of components will also reduce the need of lubrication. Further, by elimination of play associated with a synchronizer, a smoother transition between propelling and regeneration can be achieved.

The electric machine can be an electric motor or a combined electric motor and generator. The clutch is suitably a so-called dual clutch used for achieving a dual clutch transmission (DCT). For example, the first input shaft and the second input shaft which are selectively connectable to an engine via the clutch can be arranged such that the first input shaft is an inner input shaft and the second input shaft is an outer input shaft, where the inner input shaft and the outer input shaft are arranged concentrically relative to each other.

The electric machine is preferably directly connected to the first input shaft. In other words; the rotor of the electric machine is arranged on the first input shaft or connected to a component arranged on the first input shaft for providing torque. No coupling device is arranged which has to be closed for transferring torque to the first input shaft by the electric machine. Hereby, a design with relatively few components can be achieved. The rotor of the electric machine and the first input shaft can rotate with the same speed or a gear ratio can be arranged between the rotor and the first input shaft.

By connection of the electric machine to the first input shaft separately from any engine connectable to the first input shaft via the clutch, the electric machine can be used for transferring torque even if the engine is disconnected.

According to one embodiment, the transmission comprises a further electric machine connected to the second input shaft. The further electric machine can be used as a starter motor for the engine or generator driven by the engine at the same time as the electric machine connected to the first input shaft transfers torque to the output shaft. The further electric machine (and the engine) can also be used for transmitting torque to the output shaft. In addition, the further electric machine can be used for synchronizing the speeds of the second input shaft and the output shaft when shifting gears instead of synchronizing with a synchronizer resulting in heat losses.

In the same way as described for the electric machine above, the further electric machine can be an electric motor or a combined electric motor and generator. The further electric machine is preferably directly connected to the second input shaft. In other words; the rotor of the further electric machine is arranged on the second input shaft or connected to a component arranged on the second input shaft for providing torque. No coupling device is arranged which has to be closed for transferring torque to the second input shaft by the further electric machine. Hereby, a design with relatively few components can be achieved. The rotor of the further electric machine and the second input shaft can rotate with the same speed or a gear ratio can be arranged between the rotor and the second input shaft.

By connection of the further electric machine to the second input shaft separately from any engine connectable to the second input shaft via the clutch, the further electric machine can be used for transferring torque even if the engine is disconnected, for example during a pure electric drive mode.

According to another embodiment, the first input shaft is connected to the output shaft through a gear wheel arranged on the first input shaft and a gear wheel arranged on the output shaft, the gear wheel of the first input shaft and the gear wheel of the output shaft being engaged with each other. Hereby, a first basic gear ratio is achieved for the transmission used when transmitting torque from the engine and/or from the electric machine, through the first input shaft and to the output shaft.

According to a further embodiment, the second input shaft is connectable to the output shaft through a gear wheel arranged on the second input shaft and an idling gear wheel arranged on the output shaft, wherein the gear wheel of the second input shaft and the idling gear wheel of the output shaft are engaged with each other, and the idling gear wheel of the output shaft is rotationally lockable to the output shaft. Hereby, a gear ratio is achieved for the transmission used when transmitting torque from the engine, through the second input shaft and to the output shaft. In case of a further electric machine, this gear can also be used when torque is transmitted from the further electric machine, through the second input shaft and to the output shaft. By using an idling gear wheel, the gear can be deactivated, and another gear or neutral can be activated.

Preferably, the second input shaft is connectable to the output shaft through a further gear wheel arranged on the second input shaft and a further idling gear wheel arranged on the output shaft, wherein the further gear wheel of the second input shaft and the further idling gear wheel of the output shaft are engaged with each other, and the further idling gear wheel of the output shaft is rotationally lockable to the output shaft.

The transmission can comprise a coupling sleeve, wherein the idling gear wheel and the further idling gear wheel are selectively rotationally lockable to the output shaft by means of the coupling sleeve, and preferably the transmission comprises a synchronizer device comprising the coupling sleeve, wherein the synchronizer device is arranged to enable shifting between two gears and a neutral position.

According to a further embodiment, the electric machine and the further electric machine are electrically connected to each other. By electrically connected to each other is meant that energy can be transferred between the electric machines which will increase the flexibility of the transmission. It should however be stressed that each electric machine is suitably independently controlled. The electric machine and/or the further electric machine is preferably electrically connected to an energy storage device. Hereby, energy can be transferred between the electric machines via the energy storage device and one or both electric machines can be used both as motor and generator. In case AC electric machines are used, each machine is suitably connected to the energy storage device by means of an inverter for converting AC to DC, when charging the energy storage device by the generator function of the machine, and from DC to AC, when powering the electric machine by the energy storage device.

According to a further embodiment, the electric machine has a rated power exceeding the rated power of the further electric machine, and suitably the electric machine has a rated power exceeding 1.5 times the rated power of the further electric machine, and preferably the electric machine has a rated power exceeding 2 times the rated power of the further electric machine. Hereby, the electric machines can be optimized for managing the drive modes in a cost effective way. The electric machine (together with the further electric machine) can be dimensioned for covering all pure electric drive modes at the same time as the further electric machine is sufficient for generating power by means of the engine when driving at low speeds requiring torque but limited power. Generation of power during low speed enables such driving with use of one gear ratio only.

Further advantages and advantageous features of the invention are disclosed in the following description and in the claims.

BRIEF DESCRIPTION OF THE DRAWINGS

With reference to the appended drawings, below follows a more detailed description of embodiments of the invention cited as examples.

In the drawing.

DETAILED DESCRIPTION

Figure 1:
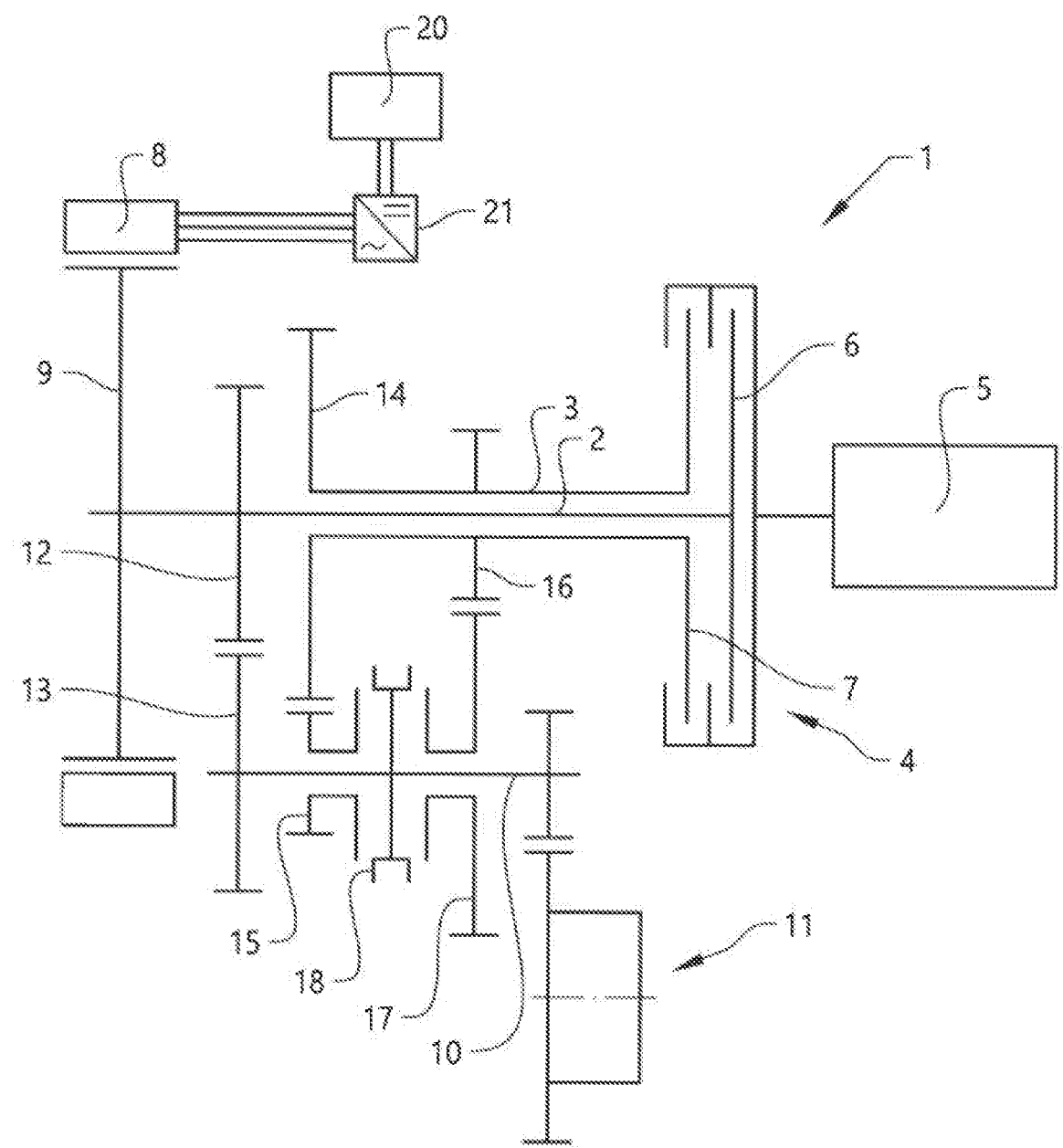
FIG. 1 is a schematic view of one example embodiment of a transmission according to the invention.

FIG. 1 is a schematic view showing a transmission 1 for a vehicle. The transmission 1 comprises a first input shaft 2, a second input shaft 3 and a clutch 4 by which the first input shaft 2 and the second input shaft 3 are selectively connectable to an engine 5. The engine 5 can be an internal combustion engine. The clutch 4 can be a dual clutch having a first clutch portion 6 for connecting the first input shaft 2 to the engine 5 and a second clutch portion 7 for connecting the second input shaft 3 to the engine 5. The first input shaft 2 can be an inner input shaft and the second input shaft 3 can be an outer input shaft, where the inner input shaft 2 and the outer input shaft 3 are arranged concentrically relative to each other with the outer input shaft 3 arranged outside of the inner input shaft 2.

The transmission 1 comprises an electric machine 8 mechanically connected to the first input shaft 2 for transmitting torque between the electric machine 8 and the first input shaft 2. The electric machine 8 is suitably directly connected to the first input shaft 2 such that the rotor of the electric machine 8 is arranged on the first input shaft 2 or connected to a component 9 which is arranged on the first input shaft 2. Although the rotor and the first input shaft 2 will rotate with same speed in the example embodiment illustrated in FIG. 1, these components could be arranged with a gear ratio between the rotor and the first input shaft. In the illustrated example embodiment in FIG. 1, the electric machine 8 is connected to the first input shaft 2 separately from the engine 5. This means that the electric machine 8 can provide torque to the first input shaft 2 even if the engine 5 is disconnected from the first input shaft 2 by the clutch 4. The electric machine 8 is suitably a combined electric motor and generator, though in another embodiment the electric machine could be an electric motor only. The electric machine 8 is suitably electrically connected to an energy storage device 20.

The electric machine 8 can be an AC motor/generator and then the electric machine is connected to an AC/DC inverter 21 which in turn is connected to the energy storage device such as a battery. The inverter 21 can be used for converting AC to DC when charging the battery 20 by the generator function of the electric machine 8, and for converting DC to AC when powering the electric machine 8 by the battery 20.

The transmission 1 further comprises an output shaft 10 connected to a final drive 11. The first input shaft 2 is permanently connected to the output shaft 10 and the second input shaft 3 is connectable to the output shaft 10. The first input shaft 2 is connected to the output shaft 10 through a gear wheel 12 arranged on the first input shaft 2 and a gear wheel 13 arranged on the output shaft 10. The gear wheel 12 of the first input shaft 2 and the gear wheel 13 of the output shaft 10 are engaged with each other for transferring torque to the output shaft 10 and further to the final drive 11. Thus, the gear wheel 12 of the first input shaft is rotationally locked relative to the first input shaft 2, and the gear wheel 13 of the output shaft 10 is rotationally locked relative to the output shaft 10.

The second input shaft 3 is connectable to the output shaft 10 through a gear wheel 14 arranged on the second input shaft 3 and an idling gear wheel 15 arranged on the output shaft 10. The gear wheel 14 of the second input shaft 3 is rotationally locked to the second input shaft 3. The gear wheel 14 of the second input shaft 3 and the idling gear wheel 15 of the output shaft 10 are engaged with each other, and the idling gear wheel 15 of the output shaft is rotationally lockable to the output shaft 10, for transferring torque to the output shaft and further to the final drive 11. The second input shaft 3 is also connectable to the output shaft 10 through a further gear wheel 16 arranged on the second input shaft 3 and a further idling gear wheel 17 arranged on the output shaft 10. The further gear wheel 16 of the second input shaft 3 is rotationally locked the second input shaft 3. The further gear wheel 16 of the second input shaft 3 and the further idling gear wheel 17 of the output shaft 10 are engaged with each other, and the further idling gear wheel 17 of the output shaft is rotationally lockable to the output shaft 10, for transferring torque to the output shaft 10 and further to the final drive 11.

Further, the transmission 1 suitably comprises a coupling sleeve 18. The idling gear wheel 15 and the further idling gear wheel 17 are selectively rotationally lockable to the output shaft 10 by means of the coupling sleeve 18. The transmission can comprise a synchronizer device comprising the coupling sleeve 18, where the synchronizer device is arranged to enable shifting between a first gear provided by the first set of gears 14, 15 and a second gear provided by the second set of gears 16, 17, and a neutral position. In FIG. 1 the coupling sleeve 18 is illustrated in the neutral position. For achieving the first gear, the coupling sleeve 18 is displaced to the left and for achieving the second gear, the coupling sleeve 18 is displaced to the right.

Although in the illustrated example embodiment, the second input shaft 3 can be selectively connected to the output shaft 10 by a first gear or second gear, of course in another embodiment of the transmission, the number of gears can be one or more depending on the application.

Figure 2:
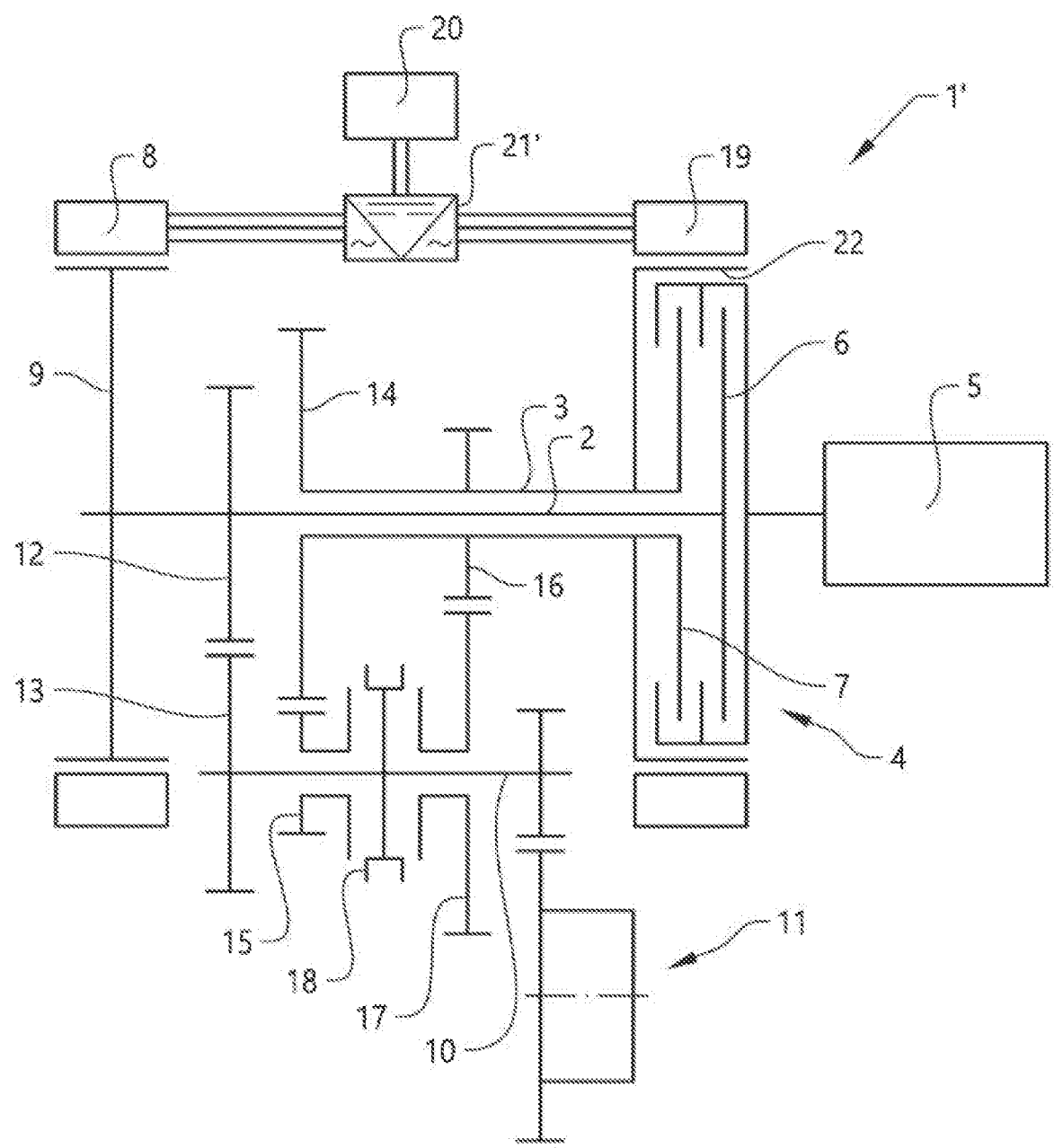
FIG. 2 is a variant of the transmission in FIG. 1.

FIG. 2 shows a variant of the transmission. With reference to FIG. 2, only additional or modified components as compared to the transmission in FIG. 1 will be described.

In this example embodiment, the transmission 1' has a further electric machine 19 mechanically connected to the second input shaft 3 for transmitting torque between the further electric machine 19 and the second input shaft 3. The further electric machine 19 is suitably directly connected to the second input shaft 3 such that the rotor of the further electric machine 8 is arranged on the second input shaft 3 or connected to a component which is arranged on the second input shaft 3. Although, in the example embodiment illustrated in FIG. 2, the rotor and the second input shaft 3 will rotate with same speed, these components could be arranged with a gear ratio between the rotor and the second input shaft. In the illustrated example embodiment in FIG. 2, the further electric machine 19 is connected to the second input shaft separately from the engine 5. This means that the further electric machine 19 can provide torque to the second input shaft 3 even if the engine 5 is disconnected from the second input shaft 3 by the clutch 4. The further electric machine 19 is arranged on a part 22 of the clutch 4 which part 22 rotates with the second output shaft 3. The further electric machine 19 is suitably a combined electric motor and generator, though in another embodiment the further electric machine could be an electric motor only. The further electric machine is suitably electrically connected to an energy storage device 20.

The electric machine 8 and the further electric machine 19 can be electrically connected to each other for transferring energy between the machines. In this example embodiment, both the electric machine 8 and the further electric machine 19 are electrically connected to the energy storage device 20. Thereby, the electric machine 8 and the further electric machine 19 are electrically connected to each other.

The electric machines 8, 19 can be AC motors/generators and then the electric machines are connected to an AC/DC inverter 21' which in turn is connected to the energy storage device 20, such as a battery. The inverter 21' can be used for converting AC to DC when charging the battery 20 by the generator function of the electric machine and/or the further electric machine, and for converting DC to AC when powering the electric machine 8 and/or the further electric machine 19 by the battery 20. Optionally, the inverter 21' can be replaced by two separated inverters, one inverter for each electric machine.

The electric machine 8 can have a rated power exceeding the rated power of the further electric machine 19, and suitably the electric machine 8 has a rated power exceeding 1.5 times the rated power of the further electric machine 19, and preferably the electric machine 8 has a rated power exceeding 2 times the rated power of the further electric machine 19.

It is to be understood that the present invention is not limited to the embodiments described above and illustrated in the drawings; rather, the skilled person will recognize that many changes and modifications may be made within the scope of the appended claims.

What is claimed is:

1. A transmission for a vehicle, the transmission comprising a first input shaft, a second input shaft and a clutch by which the first input shaft and the second input shaft are selectively connectable to an engine, and an electric machine directly connected to the first input shaft, the transmission further comprising an output shaft connected to a final drive, and a further electric machine directly connected to the second input shaft, wherein the first input shaft is permanently connected to the output shaft and the second input shaft is connectable to the output shaft, and wherein the second input shaft is connectable to the output shaft through a gear wheel arranged on the second input shaft and an idling gear wheel arranged on the output shaft, the gear wheel of the second input shaft and the idling gear wheel of the output shaft being engaged with each other, and the idling gear wheel of the output shaft being rotationally lockable to the output shaft, wherein the electric machine has a rated power exceeding the rated power of the further electric machine such that the electric machine together with the further electric machine are dimensioned for all pure electric drive modes and the further electric machine is sufficient for generating power via the engine when driving at low speeds utilizing torque and limited power.

2. The transmission according to claim 1, wherein the first input shaft is connected to the output shaft through a gear wheel arranged on the first input shaft and a gear wheel arranged on the output shaft, the gear wheel of the first input shaft and the gear wheel of the output shaft being engaged with each other.

3. The transmission according to claim 1, wherein the second input shaft is connectable to the output shaft through a further gear wheel arranged on the second input shaft and a further idling gear wheel arranged on the output shaft, the further gear wheel of the second input shaft and the further idling gear wheel of the output shaft being engaged with each other, and the further idling gear wheel of the output shaft being rotationally lockable to the output shaft.

4. The transmission according to claim 3, wherein the transmission comprises a coupling sleeve, the idling gear wheel and the further idling gear wheel being selectively rotationally lockable to the output shaft by means of the coupling sleeve.

5. The transmission according to claim 4, wherein the transmission comprises a synchronizer device comprising the coupling sleeve, the synchronizer device being arranged to enable shifting between two gears and a neutral position.

6. The transmission according to claim 1, wherein the first input shaft is an inner input shaft and the second input shaft is an outer input shaft, the inner input shaft and the outer input shaft being arranged concentrically relative to each other.

7. The transmission according to claim 1, wherein the electric machine is connected to the first input shaft separately from any engine connectable to the first input shaft via the clutch.

8. The transmission according to claim 1, wherein the electric machine is electrically connected to an energy storage device.

9. The transmission according to claim 1, wherein the further electric machine is connected to the second input shaft separately from any engine connectable to the second input shaft via the clutch.

10. The transmission according to claim 1, wherein the electric machine and the further electric machine are electrically connected to each other.

11. The transmission according to claim 1, wherein the electric machine has a rated power exceeding 1.5 times the rated power of the further electric machine.

12. The transmission according to claim 1, wherein the electric machine has a rated power exceeding 2 times the rated power of the further electric machine.

\* \* \* \* \*